United States Patent Office 3,151,392
Patented Oct. 6, 1964

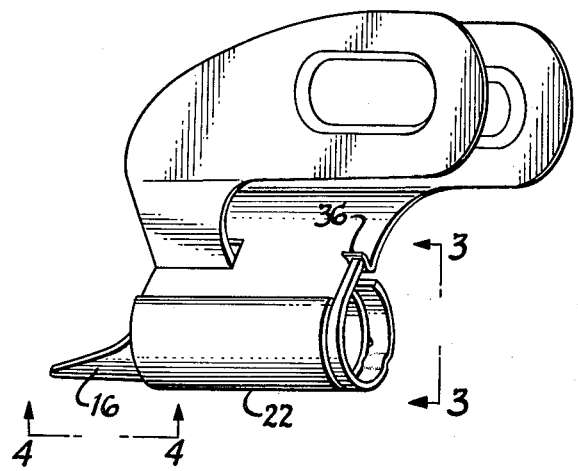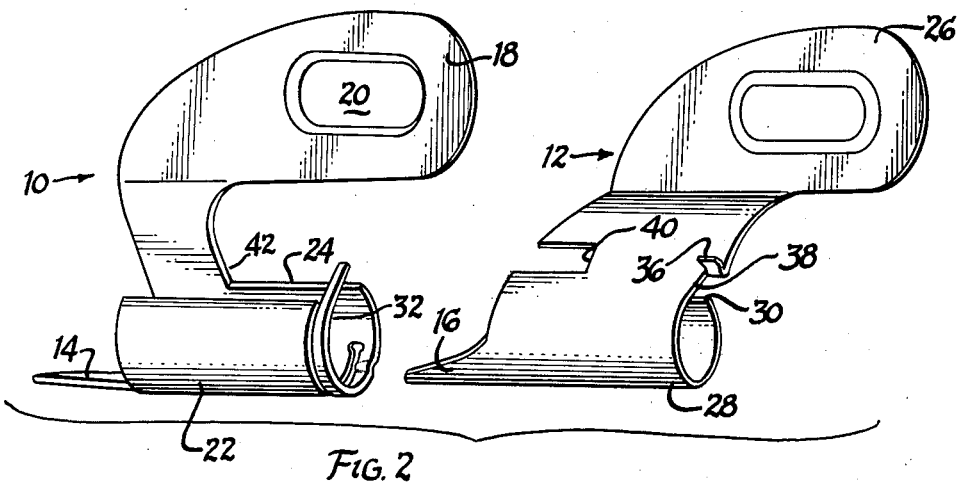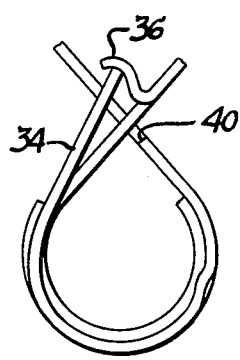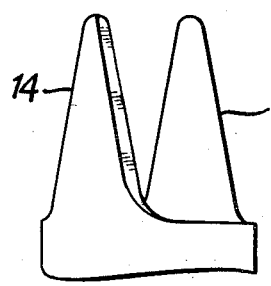
INVENTOR.
ARTHUR E. CHAMBERS
BY
WILSON, SETTLE & CRAIG
ATTORNEYS

3,151,392
SUTURE CUTTER
Arthur E. Chambers, 21370 Knudsen, Grosse Ile, Mich.
Filed Feb. 18, 1963, Ser. No. 259,165
3 Claims. (Cl. 30—240)

This invention relates to a shear, and more particularly to one of simple construction, having only two parts, both of which can be easily and cheaply fabricated from sheet metal. Such a shear is particularly but not exclusively adapted to cutting sutures in surgical operations and is cheap enough to be used in a kit of disposable instruments and supplies adapted to be pre-sterilized and packaged for use in a single operation, after which all the articles used are disposed of.

One of the objects of the invention is to provide an economical shear which can be readily formed from flat sheet metal stock and which can be easily assembled without tools.

Another object is to provide such a shear which inherently urges the shear blades resiliently into contact with each other along their cutting edges, thus providing an effective cutting instrument.

Another object is to provide a normally open shear with an integrally formed return spring for urging it to open position.

Another object is to provide such a shear in which there is a positive lock for holding the shear blades axially together after they have been assembled, such positive lock being, however, releasable and preferably formed by the return spring.

Another object is to provide a shear which is composed entirely of developable surfaces so that it can be formed from a flat sheet by a simple bending operation and without stretching or other deformation requiring expensive dies.

Other objects and advantages of the invention will be apparent from the following description and appended claims, reference being made to the accompanying drawings, in which each reference character, wherever it occurs, always refers to the same part.

In the drawings:

FIGURE 1 is a perspective view of an assembled shear embodying one form of the invention;

FIGURE 2 is an exploded perspective view of the shear of FIGURE 1 taken apart;

FIGURE 3 is an end elevation as seen from a plane whose trace is the line 3—3 in FIGURE 1;

FIGURE 4 is a bottom plan view of a portion of the shear as seen from a plane whose trace is the line 4—4 in FIGURE 1.

Before explaining the present invention in detail, it is to be understood that the invention is not limited to the particular construction or arrangement described herein or shown in the accompanying drawings, which are for illustration only, since the invention can be embodied in other forms and can be practiced or carried out in various ways. Also it is to be understood that the phraseology or terminology used herein is only for the purpose of description and illustration and does not constitute a limitation of the invention.

Referring to the drawings, the shear includes an outer member 10 and an inner member 12, each having a shear blade 14 or 16 formed integrally with it. Each member is preferably formed of resilient flat sheet metal stock. The outer member 10 has one end formed into any suitable handle 18 which may be roughened or embossed to provide a grip 20. The other end of the member 10 is rolled or bent into a generally cylindrical tube 22 which carries the blade 14 and which is slit axially throughout its length as indicated at 24 to provide a transversely resilient tube.

The member 12 is similarly formed into a handle 26 at one end and a cylindrical tube 28 at its other end, the tube being slit axially throughout its length as indicated at 30. The tube 28 carries the shear blade 16. The outer tube 22 has an internal diameter which is normally slightly less than the normal external diameter of the inner tube 28, and the inner tube may have an external diameter which is normally greater than the normal internal diameter of the outer tube 22. The word normal refers to the state or dimension of the tube when in repose, that is, not stressed by any external force.

When the shear is assembled the inner tube 28 is compressed slightly or the outer tube 22 is expanded slightly, or both are done, and one tube is slid into the other. When the tubes are in final position as shown in FIGURE 1, the tubes are resiliently urged toward each other by the inherent resilience of the material. This constantly urges the shear blades 14 and 16 into engagement and provides effective cutting action.

The outer tube 22 is slit circumferentially through a part only of its circumference to provide a tongue in the form of an arcuate torsion spring 32, the end of which is formed as a tangential portion 34, the outer end of which is engaged by an abutment 36 formed integrally with the member 12. Preferably the abutment is notched or arcuate as shown in FIGURE 3 to retain the end of the spring 32.

The spring 32 is curved so that its radius of curvature when in repose is less than the radius of curvature of the outer tube 22, and preferably even less than the radius of the inner tube 28. The inner tube 28 is shorter than the outer tube 22 so that when the shear is assembled the inner tube 28 lies wholly to the left of the spring as FIGURE 1 is seen and the spring snaps behind the end of the inner tube as shown in FIGURE 3 to provide means for holding the members positively against axial displacement. The inner tube 28 has a tangentially extending portion 38 adjacent the slit 30 and a notch 40 formed in this tangential portion to receive the handle 18 of the outer tube. The shoulder 42 on the handle 18 and the bottom of the notch 40 hold the members against axial displacement in one direction while the spring 32 snapped behind the end of the inner tube 28 holds them against axial displacement in the opposite direction. In the assembled shear, the handles 18 and 26 join their respective tubes 22 and 28 at one side of the slot and are inclined in opposite tangential directions relative to each other to achieve the crossed handle relationship best seen in FIGURE 3. In order to achieve this relationship, the handles are axially offset from each other at the points where they join their respective tubes.

The spring constantly urges the shear to open position by pushing on the abutment 36 until the side of the notch 40 forms a stop for the handle 18 in the opening of the shear.

The internal diameter of the sleeve 22 and the external diameter of the sleeve 28 are referred to herein as matching diameters.

While I prefer to make both elements of flat strip stock as has been described above, some of the advantages of the invention can be realized by making only one of the members of flat strip stock and matching it with another tubular member carrying a shear blade formed in any suitable manner and provided with any suitable handle.

To assemble the shear either the tube 22 is expanded or the tube 28 is compressed, which can be done by the fingers, until the matching diameter of the tube 28 is less than the matching diameter of the tube 22. Then the tube 28 is inserted into the tube 22, the tangential end 34 of the spring 32 being moved out of the way to clear the tube 28. The tubes are then slid together until the shoulder 42 strikes the bottom of the notch 40 at which time the tube 28 is located entirely to the left of the spring 32 as FIGURE 1 is seen, and the spring 32 snaps behind the end of the tube 28 to lock the assembly together.

The device can be taken apart by the reverse procedure, lifting the tangential end 34 of the spring out of the abutment 36 to clear the end of the tube 28, after which the tube 28 can be slid to the right out of the tube 22.

I claim:

1. A shear comprising a pair of shear elements, each of said elements having a tubular generally cylindrical portion with the cylindrical portion of one of said elements received within the cylindrical portion of the other of said elements for co-axial rotation therein, cooperating shear blades projecting from one end of both cylindrical portions movable in shearing relationship with each other upon rotation of one cylindrical portion in a first direction relative to the other, means defining a slit extending circumferentially partially around one of said cylindrical portions to terminate at one end at an axially extending slit extending from said circumferential slit to the opposite end of said one cylindrical portion to define a resilient arm at said opposite end of said one cylindrical portion, said arm projecting from the cylindrical portion of said one element into engagement with the other element to rotatably bias said elements in a direction resiliently urging said shear blades toward an open relationship with each other, the other of said cylindrical portions having its opposite end axially aligned with said circumferential slit and engaged with a side of said arm to limit axial movement of said cylindrical portions relative to each other, and cooperable handle portions projecting from each of said cylindrical portions for rotating said cylindrical portions against the biasing action of said arm means.

2. A shear comprising a pair of shear elements, a tubular generally cylindrical portion on each of said elements having an axially extending slot therethrough, the cylindrical portion of one of said elements being received within the cylindrical portion of the other of said elements for coaxial rotation therein, cooperating shear blades projecting from one end of both elements movable from an open relationship in shearing relationship with each other upon rotation of one element in a first direction relative to the other, resilient arm means integral with and projecting from the cylindrical portion of one element into engagement with the other element rotatably biasing said elements in a direction resiliently urging said shear blades toward said open relationship with each other, and handle portions integral with each cylindrical portion at one side of the slot therein and projecting generally tangentially outwardly from their respective cylindrical portions in axially offset oppositely inclined crossed relationship with each other, said handle portions being operable to rotate said cylindrical portions against the biasing action of said arm means.

3. A shear as defined in claim 2 wherein said arm means comprises means defining a slit extending circumferentially partially around one of said cylindrical portions to terminate at one end at an axially extending slit extending from said circumferential slit to the opposite end of said one cylindrical portion to define an arm at said opposite end of said one cylindrical portion, the other of said cylindrical portion having its opposite end axially aligned with said circumferential slit and engaged with a side of said arm to limit axial movement of said other cylindrical portion in one direction, and said crossed handle portions being engaged with each other to limit axial movement of said other cylindrical portion in the opposite direction.

References Cited in the file of this patent

UNITED STATES PATENTS

| | | |
|---|---|---|
| 1,973,631 | Johnson | Sept. 11, 1934 |
| 2,262,315 | Davies | Nov. 11, 1941 |
| 2,951,288 | Holmes | Sept. 6, 1960 |